(12) United States Patent
Wen et al.

(10) Patent No.: US 12,242,750 B2
(45) Date of Patent: Mar. 4, 2025

(54) ETHERNET STORAGE SYSTEM, AND INFORMATION NOTIFICATION METHOD AND RELATED APPARATUS THEREOF

(71) Applicant: HUAWEI TECHNOLOGIES CO., LTD., Guangdong (CN)

(72) Inventors: Huafeng Wen, Nanjing (CN); Sheng Peng, Shenzhen (CN); Qinzhi Wu, Nanjing (CN); Liangchuan Gao, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 31 days.

(21) Appl. No.: 18/063,837

(22) Filed: Dec. 9, 2022

(65) Prior Publication Data

US 2023/0111966 A1   Apr. 13, 2023

Related U.S. Application Data

(63) Continuation of application No. PCT/CN2021/095350, filed on May 21, 2021.

(30) Foreign Application Priority Data

Jun. 12, 2020 (CN) .......................... 202010537494.2

(51) Int. Cl.
*G06F 3/06* (2006.01)
*H04L 41/0803* (2022.01)
(Continued)

(52) U.S. Cl.
CPC .......... *G06F 3/0652* (2013.01); *G06F 3/0622* (2013.01); *G06F 3/067* (2013.01);
(Continued)

(58) Field of Classification Search
CPC ...... G06F 3/0652; G06F 3/0622; G06F 3/067; H04L 41/0803; H04L 43/0811; H04L 67/1097
See application file for complete search history.

(56) References Cited

U.S. PATENT DOCUMENTS

| | | | | |
|---|---|---|---|---|
| 6,765,919 B1 * | 7/2004 | Banks | ................... | H04L 49/357 370/254 |
| 7,362,717 B1 * | 4/2008 | Betker | .................. | H04L 61/103 370/254 |

(Continued)

FOREIGN PATENT DOCUMENTS

| | | |
|---|---|---|
| CN | 105306387 A | 2/2016 |
| CN | 107948248 A | 4/2018 |

(Continued)

OTHER PUBLICATIONS

D. Katz et al. "Request for Comments (RFC) 5880: Bidirectional Forwarding Detection (BFD)", Jun. 2010, 49 pages. (Year: 2010).*

(Continued)

*Primary Examiner* — George C Neurauter, Jr.
(74) *Attorney, Agent, or Firm* — WOMBLE BOND DICKINSON (US) LLP

(57) ABSTRACT

This application discloses an information notification method and a related apparatus. The Ethernet storage system includes a first switching device and a first node, and the first switching device is an access device of the first node. The first node sends a join message to the first switching device. The join message includes an identifier of the first node and configuration information of the first node. The first switching device receives the join message, obtains the identifier of the first node based on the join message, determines, based on the identifier of the first node, a first zone corresponding to the first node, and sends a join notification message to a second node that belongs to the first zone. The join notifi- (Continued)

cation message includes the identifier of the first node and the configuration information of the first node.

26 Claims, 9 Drawing Sheets

(51) Int. Cl.
 H04L 43/0811 (2022.01)
 H04L 67/1097 (2022.01)
(52) U.S. Cl.
 CPC ...... *H04L 41/0803* (2013.01); *H04L 43/0811* (2013.01); *H04L 67/1097* (2013.01)

(56) References Cited

U.S. PATENT DOCUMENTS

| | | | | |
|---|---|---|---|---|
| 8,295,288 | B2* | 10/2012 | Chen | H04L 49/552 370/395.31 |
| 8,713,295 | B2* | 4/2014 | Bax | G06F 9/4405 713/1 |
| 8,775,580 | B2* | 7/2014 | Cheethirala | H04L 49/70 709/224 |
| 8,917,722 | B2* | 12/2014 | Eisenhauer | H04L 49/253 398/58 |
| 8,929,368 | B2* | 1/2015 | Zhang | H04L 12/4641 709/228 |
| 8,989,020 | B2* | 3/2015 | So | H04L 41/5009 370/241 |
| 9,391,796 | B1* | 7/2016 | Shekhar | H04L 49/357 |
| 9,455,906 | B2* | 9/2016 | Ayandeh | H04L 49/351 |
| 9,641,249 | B2* | 5/2017 | Kaneriya | H04L 67/1097 |
| 10,230,688 | B1* | 3/2019 | Subbiah | H04L 61/2596 |
| 10,374,980 | B1* | 8/2019 | Willeke | H04L 12/4675 |
| 11,297,009 | B2* | 4/2022 | Tummala | H04L 49/357 |
| 11,431,715 | B2* | 8/2022 | Tummala | H04L 63/101 |
| 2005/0111378 | A1* | 5/2005 | Chen | H04L 43/00 370/252 |
| 2009/0292813 | A1* | 11/2009 | Snively | H04L 61/5038 709/228 |
| 2011/0022693 | A1 | 1/2011 | Cheethirala et al. | |
| 2017/0034008 | A1 | 2/2017 | Puttagunta et al. | |
| 2019/0199652 | A1* | 6/2019 | Subbiah | H04L 49/201 |
| 2022/0083496 | A1* | 3/2022 | Subbiah | G06F 13/1668 |
| 2022/0263752 | A1* | 8/2022 | Sharma | H04L 45/22 |
| 2022/0334717 | A1* | 10/2022 | Barabash | G06F 3/061 |
| 2023/0111966 | A1* | 4/2023 | Wen | G06F 3/067 |

FOREIGN PATENT DOCUMENTS

| | | |
|---|---|---|
| CN | 109358813 A | 2/2019 |
| CN | 109995813 A | 7/2019 |
| CN | 110233798 A | 9/2019 |
| CN | 110602244 A | 12/2019 |
| JP | 2011227712 A | 11/2011 |
| WO | 2016018242 A1 | 2/2016 |

OTHER PUBLICATIONS

Fibre Channel Zoning Basics, Live Webcast Jun. 27, 2019, total 43 pages.

* cited by examiner

| Node | Zone |
|---|---|
| 320a | Zone 1 zone 2 |
| 320b | Zone 1 zone 3 |
| 320c | Zone 2 |
| 320d | Zone 1 zone 2 zone 3 |

FIG. 5A

| Zone | Node |
|---|---|
| Zone 1 | 320a 320b 320d |
| Zone 2 | 320a 320c 320d |
| Zone 3 | 320b 320d |

FIG. 5B

| Zone | Node |
|---|---|
| Zone 1 | 320b |
| Zone 2 | 320c |
| Zone 3 | 320b |

FIG. 6A

| Zone | Node |
|---|---|
| Zone 1 | 320a 320b |
| Zone 2 | 320a 320c |
| Zone 3 | 320b |

FIG. 6B

| Node | Access device | Access device port | Status | Fault cause | Configuration information |
|---|---|---|---|---|---|
| 320b | 310a | 1 | Valid | None | N/A |
| 320c | 310b | 1 | Valid | None | N/A |
| 320a | 310a | 2 | Valid | None | N/A |

FIG. 7A

| Node | Access device | Access device port | Status | Fault cause | Configuration information |
|---|---|---|---|---|---|
| 320b | 310a | 1 | Valid | None | N/A |
| 320c | 310b | 1 | Valid | None | N/A |
| 320a | 310a | 2 | Invalid | CRC error | N/A |

FIG. 7B

ETHERNET STORAGE SYSTEM, AND INFORMATION NOTIFICATION METHOD AND RELATED APPARATUS THEREOF

CROSS-REFERENCE TO RELATED APPLICATIONS

This application is a continuation of International Application No. PCT/CN2021/095350 filed on May 21, 2021, which claims priority to Chinese Patent Application No. 202010537494.2 filed on Jun. 12, 2020. The disclosures of the aforementioned applications are hereby incorporated by reference in their entireties.

TECHNICAL FIELD

The present disclosure relates to the field of Ethernet technologies, and in particular, to an Ethernet storage system, and an information notification method and a related apparatus that are used in the Ethernet storage system.

BACKGROUND

Distributed storage is a data storage technology in which data is stored on storage nodes at different locations in a distributed manner. These storage nodes at different locations are interconnected by using a switching device, to transmit data and exchange information. A node that accesses and uses the data in the storage node is referred to as a compute node. The storage node, the switching device, and the compute node form a distributed storage system. When the switching device in the distributed storage system is an Ethernet switching device, the distributed storage system is referred to as an Ethernet storage system in this application. A node in the Ethernet storage system needs to obtain information about another node that the node can communicate with.

SUMMARY

This application provides an Ethernet storage system, and an information notification method and a related apparatus that are used in the Ethernet storage system, so that nodes (including a storage node and a compute node) in the Ethernet storage system can quickly obtain information about another node that the nodes can communicate with, to improve a service processing capability of the Ethernet storage system.

According to a first aspect of this application, an Ethernet storage system is provided, including a first switching device and a first node. The first switching device is an access device of the first node. The first node is configured to send a join message to the first switching device. The join message includes an identifier of the first node and configuration information of the first node. The first switching device is configured to: receive the join message, obtain the identifier of the first node based on the join message, determine, based on the identifier of the first node, a first zone corresponding to the first node, and send a join notification message to a second node that belongs to the first zone. The join notification message includes the identifier of the first node and the configuration information of the first node.

In an embodiment, the first switching device is any edge switching device (namely, an access device). After the first node accesses the first switching device, the first node sends a join message to the first switching device. The join message includes an identifier of the first node and configuration information of the first node. After receiving the join message, the first switching device determines a first zone (there may be one or more first zones) to which the first node belongs, and then sends a join notification message to a second node (there may be one or more second nodes) that belongs to each first zone. The join notification message includes the identifier of the first node and the configuration information of the first node. In this way, all other nodes that belong to a same zone as the first node can obtain the configuration information of the first node, to communicate with the first node.

Further, the first switching device is further configured to send a node notification message to the first node. The node notification message includes an identifier of the second node and configuration information of the second node. The first node is further configured to: receive the node notification message, and obtain and store the identifier of the second node and the configuration information of the second node based on the node notification message.

In an embodiment, the first switching device further sends, to the first node, the configuration information of the second node that belongs to the same zone as the first node. In this way, the first node may also obtain configuration information of another node that the first node can communicate with. Therefore, communication between the first node and the other node becomes possible, and a service processing capability of the Ethernet storage system is improved.

In an embodiment, the first switching device is configured to determine, based on a zone table and the identifier of the first node, the first zone corresponding to the first node. The zone table records a correspondence between a zone and an identifier of a node.

In an embodiment, each edge switching device stores a zone table, so that each edge switching device can quickly determine the second node that belongs to the same zone as the first node, and send a join notification message to the second node. This improves efficiency of sending configuration information, and further improves the service processing capability of the Ethernet storage system.

In an embodiment, the first switching device is further configured to: record information about the first node in a zone dynamic table; and determine, based on the zone dynamic table, that the second node is an active node of the first zone. The zone dynamic table records information about an active node corresponding to each zone.

In an embodiment, the first switching device further stores a zone dynamic table, to record information about an active node. In this way, the first switching device may send the configuration information of the first node only to the active node recorded in the zone dynamic table. This can avoid a waste of network resources caused by sending the node configuration information to an invalid node.

In an embodiment, the information about the active node includes information about an access device of the active node, and the first switching device is further configured to: determine a target switching device based on information about an access device of each active node in the zone dynamic table, and detect whether communication between the first switching device and the target switching device is interrupted.

In an embodiment, when the Ethernet storage system includes a plurality of switching devices, to avoid impact of a network fault on a service, the first switching device further determines an access device corresponding to an active node, uses the access device as a target switching device, and detects whether communication between the first switching device and the target switching device is interrupted. This can improve service reliability.

In an embodiment, when the communication between the first switching device and the target switching device is interrupted, the first switching device is further configured to determine a target node corresponding to the target switching device, delete information about the target node from the zone dynamic table, and send a deletion notification message. The deletion notification message includes an identifier of the target node.

In an embodiment, when the communication between the first switching device and the target switching device is interrupted, the first switching device cannot send a message to a node (namely, a target node) connected to the target switching device, and cannot receive a message from the target node. In this case, the first switch determines, based on the zone dynamic table of the first switch, that all nodes connected to the target switching device are used as target nodes, deletes information about the target node from the zone dynamic table, and sends a deletion notification message. A sequence in which the first switching device deletes the information about the target node and sends the deletion notification message is not limited in this application. The first switching device may determine another node that belongs to a same zone as each target node, and send the deletion notification message including an identifier of the target node to the another node. The deletion notification message may be directly sent to the another node, or may be sent to the another node by using a reflector.

In an embodiment, the Ethernet storage system further includes a second switching device. The second switching device is a reflector. A function of a reflector is to send a message received from one switching device to another switching device. In an embodiment, the second switching device is configured to send the zone table to the first switching device. In this case, the zone table may be configured by an administrator on the second switching device serving as a reflector. In an embodiment, the first switching device is further configured to send the zone dynamic table to the second switching device. In this way, the second switching device may send the zone dynamic table to another switching device, to implement synchronization of the zone dynamic table on all edge switching devices. The sending the zone dynamic table may be sending a complete zone dynamic table, or may be sending only update information of the zone dynamic table. The reflector may be deployed on an edge switching device, or may be deployed on an aggregation switching device or a backbone switching device.

In an embodiment, when the Ethernet storage system includes a plurality of switching devices, a reflector is specified from the plurality of switching devices, so that synchronization of the zone dynamic table on all edge switching devices in the Ethernet storage system can be implemented. In this way, sending configuration information to a node can be performed by a device closest to the node. This improves information notification efficiency and saves network bandwidth resources.

In an embodiment, when the first switching device sends the join notification message to the second node that belongs to the first zone, the first switching device is configured to send the join notification message to the second switching device, and when the second switching device is an access device of the second node, the second switching device is configured to send the join notification message to the second node; or when the second switching device is not an access device of the second node, the second switching device is configured to send the join notification message to the second node by using a third switching device. The second node accesses the third switching device. Optionally, the Ethernet storage system further includes a fourth switching device, and the second switching device is further configured to:

send the join notification message to the fourth switching device; and send the zone dynamic table to the third switching device and the fourth switching device.

The embodiments of this application may be applied to a plurality of different scenarios. Regardless of whether the second switching device serving as a reflector is an access device of the second node, the first switching device may first send the first switching device to the second switching device, and the second switching device then forwards the join notification message. This application can implement centralized management of node configuration information, to ensure consistency of the node configuration information stored in the Ethernet storage system.

In an embodiment, the first node is further configured to send a leave message to the first switching device. The leave message includes the identifier of the first node. The first switching device is further configured to: receive the leave message, obtain the identifier of the first node based on the leave message, determine, based on the identifier of the first node, the first zone, and send a leave notification message to a third node that belongs to the first zone. The leave notification message includes the identifier of the first node.

In an embodiment, before leaving the Ethernet storage system, the first node needs to send a leave message to the first switching device, so that the first switching device sends the leave message of the first node to a third node that belongs to the same zone as the first node. This can prevent the third node from further sending a service request to the first node after the first node leaves, and improves service reliability.

In an embodiment, the first switching device is further configured to: detect whether the first node is locally reachable; and when the first node is locally unreachable, determine the first zone and send a fault notification message to a fourth node that belongs to the first zone. The fault notification message includes the identifier of the first node.

In an embodiment, after sending that the first node is locally unreachable, the first switching device sends a fault notification message of the first node to a fourth node that belongs to the same zone as the first node. This can prevent the fourth node from sending a service request to the first node after the first node leaves, and improves service reliability.

The first node, the second node, the third node, and the fourth node in this application are used to distinguish between different nodes in different scenarios, but do not point to a specific node. For example, a node A that sends a join message at a first moment is a first node, a node A that receives a node join message of a node B at a second moment is a second node, a node A that receives a node leave message of a node C at a third moment is a third node, and a node A that receives a fault notification message of a node D at a fourth moment is a fourth node.

According to a second aspect of this application, an information notification method is disclosed, which may be applied to a first switching device in an Ethernet storage system. The first switching device receives a join message sent by a first node. The join message includes an identifier of the first node and configuration information of the first node. The first switching device is an access device of the first node. The first switching device obtains the identifier of the first node based on the join message, determines, based on the identifier of the first node, a first zone corresponding to the first node; and; and sends a join notification message to a second node that belongs to the first zone. The join notification message includes the identifier of the first node and the configuration information of the first node.

In an embodiment, the first switching device sends a node notification message to the first node. The node notification message includes an identifier of the second node and configuration information of the second node.

In an embodiment, the first switching device determines, based on a zone table and the identifier of the first node, the first zone corresponding to the first node. The zone table records a correspondence between a zone and an identifier of a node.

In an embodiment, the first switching device records information about the first node in a zone dynamic table; and determines, based on the zone dynamic table, that the second node is an active node of the first zone. The zone dynamic table records information about an active node corresponding to each zone.

In an embodiment, the information about the active node includes information about an access device of the active node, and the first switching device determines a target switching device based on information about an access device of each active node in the zone dynamic table, and detects whether communication between the first switching device and the target switching device is interrupted.

In an embodiment, when the communication between the first switching device and the target switching device is interrupted, the first switching device further determines a target node corresponding to the target switching device, deletes information about the target node from the zone dynamic table, and sends a deletion notification message. The deletion notification message includes an identifier of the target node.

In an embodiment, the Ethernet storage system further includes a second switching device. The second switching device is a reflector. The first switching device further receives the zone table sent by the second switching device, and sends the zone dynamic table to the second switching device.

In an embodiment, the first switching device sends the join notification message to the second switching device.

In an embodiment, the first switching device further receives a leave message sent by the first node, where the leave message includes the identifier of the first node, determines the first zone based on the identifier of the first node, and sends a leave notification message to a third node that belongs to the first zone. The leave notification message includes the identifier of the first node.

In an embodiment, the first switching device further detects whether the first node is locally reachable, and when the first node is locally unreachable, determines the first zone and sends a fault notification message to a fourth node that belongs to the first zone. The fault notification message includes the identifier of the first node.

According to a third aspect of this application, an information notification method is disclosed, applied to a first node in an Ethernet storage system. The first node sends a join message to a first switching device in the Ethernet storage system. The join message includes an identifier of the first node and configuration information of the first node. The first switching device is an access device of the first node. The first node further receives a node notification message sent by the first switching device. The node notification message includes an identifier of a second node and configuration information of the second node. The second node and the first node belong to a same zone.

In an embodiment, the first node further obtains and stores information about the second node. The information about the second node includes the identifier of the second node and the configuration information of the second node.

In an embodiment, the first node receives a deletion message sent by the first switching device, where the deletion message includes the identifier of the second node; and deletes the information about the second node based on the deletion message.

According to different scenarios, the deletion message may be a node leave message, a deletion notification message, or a fault notification message.

A fourth aspect of this application provides a switching device. The switching device includes function modules that perform the information notification method according to the second aspect or any possible design of the second aspect. Division into the function modules is not limited in this application. The function modules may be correspondingly divided based on procedure operations of the information notification method in the first aspect, or the function modules may be divided based on a specific implementation requirement.

A fifth aspect of this application provides a node. The node includes function modules that perform the information notification method according to the third aspect or any possible design of the third aspect. Division into the function modules is not limited in this application. The function modules may be correspondingly divided based on procedure operations of the information notification method in the third aspect, or the function modules may be divided based on a specific implementation requirement.

A sixth aspect of this application provides a host. A node runs on the host, and the host includes a memory, a processor, and a communications interface. The memory is configured to store computer program code and data, and the processor is configured to invoke the computer program code so that the node implements, with a combination of the data, the information notification method according to the third aspect and any possible design of the third aspect of this application.

A seventh aspect of this application provides a chip. When the chip runs, the chip can implement the information notification method according to the second aspect and any possible design of the second aspect of this application, and implement the information notification method according to the third aspect and any possible design of the third aspect of this application.

An eighth aspect of this application provides a storage medium. The storage medium stores program code, and when the program code is run, a device (a switch, a server, a terminal device) that runs the program code is enabled to implement the information notification method according to the second aspect and any possible design of the second aspect of this application, and implement the information notification method according to the third aspect and any possible design of the third aspect of this application.

For beneficial effects of the second aspect to the eighth aspect, refer to descriptions of beneficial effects of the first aspect and possible designs of the first aspect. Details are not described herein again.

BRIEF DESCRIPTION OF DRAWINGS

FIG. 5A and FIG. 5B are schematic diagrams of structures of zone tables according to an embodiment of this application;

FIG. 6A is a schematic diagram of a zone dynamic table before an update according to an embodiment of this application;

FIG. 6B is a schematic diagram of a zone dynamic table after an update according to an embodiment of this application;

FIG. 7A is a schematic diagram of a node dynamic table according to an embodiment of this application;

FIG. 7B is a schematic diagram of a node dynamic table obtained after a port is faulty according to an embodiment of this application;

DESCRIPTION OF EMBODIMENTS

Figure 1:
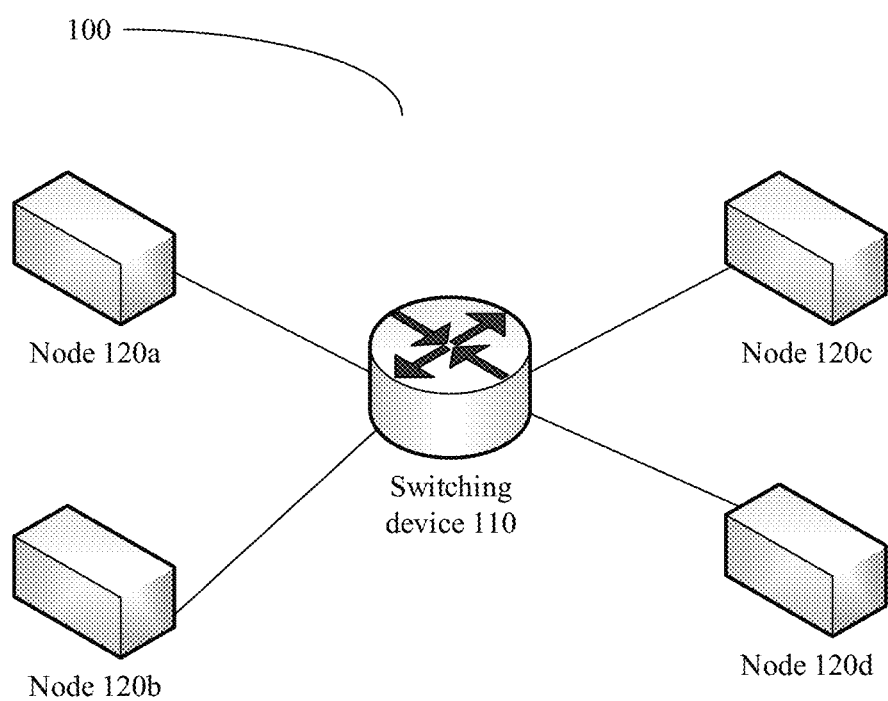
FIG. 1 is a schematic diagram of a structure of an Ethernet storage system according to an embodiment of this application.

In embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

In embodiments of this application, unless otherwise stated, "a plurality of" means two or more than two. For example, a plurality of nodes mean two or more nodes. "At least one" means any quantity, for example, one, two, or more than two. "A and/or B" may represent that only A exists, only B exists, or both A and B are included. "At least one of A, B, and C" may represent that only A exists, only B exists, only C exists, A and B are included, B and C are included, A and C are included, or A, B, and C are included. In this application, terms such as "first" and "second" are merely used for distinguishing between different objects, but are not used to indicate priorities or importance of the objects. Embodiments of this application are used to enable a node in an Ethernet storage system to quickly obtain information about another node that belongs to a same zone, improve a service processing capability of the Ethernet storage system, and prevent the node from communicating with an abnormal node. This improves reliability of the Ethernet storage system. In this application, for a purpose of allowing specific nodes/devices to communicate with each other, a group including these nodes/devices is referred to as a zone. The zone is similar to a small virtual private network (VPN). To make the objectives, technical solutions, and advantages of this application clearer, the following further describes this application in detail with reference to the accompanying drawings.

Embodiments of this application are applied to an Ethernet storage system. The Ethernet storage system includes a plurality of nodes and at least one switching device (the switching device in this application is an Ethernet switching device). Each of the plurality of nodes is connected to a corresponding switching device (which may be referred to as an edge switching device or a leaf switching device), to publish information to the switching device or receive information from the switching device. In terms of forms, the node in this application may be a physical device, or may be a virtual device deployed on a physical device. When a node is a virtual device, a plurality of nodes may be carried on a same physical device. The physical device may be a device that can carry a node, for example, a physical server, a workstation, a mobile station, or a general-purpose computer. In terms of functions, the node in this application may be a compute node (for example, a server) or a storage node (for example, a storage array).

Figure 2:
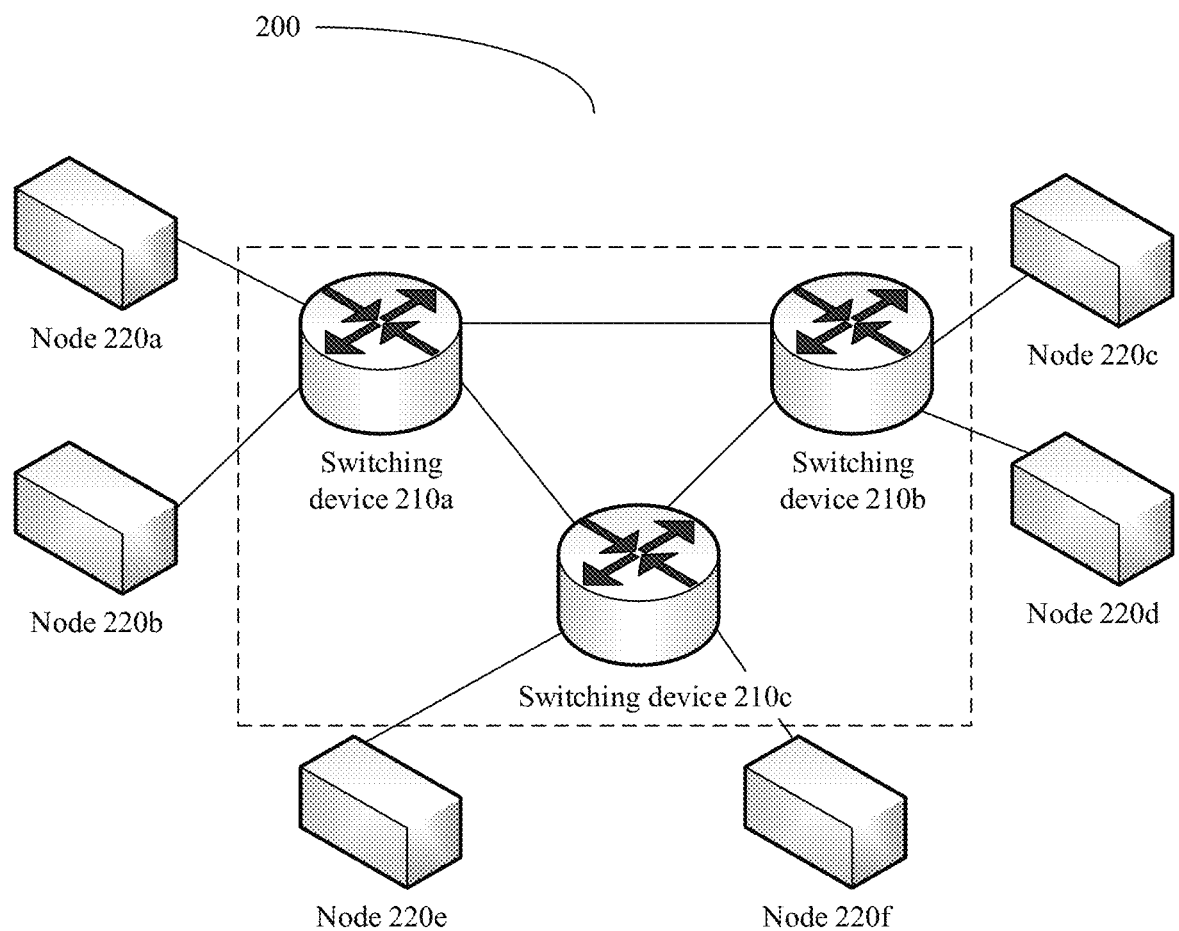
FIG. 2 is a schematic diagram of a structure of another Ethernet storage system according to an embodiment of this application.

In an embodiment, the Ethernet storage system may be an Ethernet storage system 100 shown in FIG. 1, including a switching device 110 and a plurality of nodes 120 (nodes 120a to 120d shown in FIG. 1) connected to the switching device 110. In another embodiment, the Ethernet storage system may be an Ethernet storage system 200 shown in FIG. 2, including a plurality of switching devices 210 (switching devices 210a to 210c shown in the figure) and a plurality of nodes 220 (nodes 220a to 220f shown in FIG. 2). Each node of the nodes 220a to 220f is connected to a corresponding switching device (namely, an edge switching device), and the plurality of switching devices 210a to 210c are connected to each other. In still another embodiment, the Ethernet storage system is an Ethernet storage system 300 shown in FIG. 3, including a plurality of switching devices 310 (switching devices 310a to 310d shown in the figure) and a plurality of nodes 320 (nodes 320a to 320d shown in FIG. 3). Each node of the plurality of nodes 320a to 320d is connected to a corresponding edge switching device, and the plurality of switching devices 310a to 310d include edge switching devices 310a and 310b and backbone switching devices 310c and 310d. The edge switching devices 310a and 310b communicate with each other by using the backbone switching devices 310c and 310d. In an embodiment, the Ethernet storage system may further include an aggregation switching device (not shown in the figure), and the aggregation switching device is configured to connect the backbone switching device and the edge switching device. When the Ethernet storage system includes a plurality of switching devices, the plurality of switching devices form a switch fabric (which may be referred to as a fabric), and the switch fabric is transparent to a node. For example, the switching devices 210a to 210c in FIG. 2 form a switch fabric, and the switching devices 310a to 310d in FIG. 3 form a switch fabric. In this application, a node connected to a switching device is referred to as a local node of the switching device, and the switching device is referred to as an access device of the local node. For example, in FIG. 3, the nodes 320a and 320b are local nodes of the switching device 310a, and the switching device 310b is an access device of the nodes 320c and 320d.

When the Ethernet storage system includes a plurality of switching devices, at least one switching device of the plurality of switching devices is configured as a reflector (which can implement a function of the reflector). A reflector is equivalent to a collection point in a switch fabric, configured to receive information sent by a switching device and send the information to another switching device, to implement information synchronization in the entire switch fabric. For example, the switching device 210c in FIG. 2 may be configured as a reflector, and the switching devices 310*c* and 310*d* in FIG. 3 may be configured as reflectors.

In an Ethernet storage system, nodes are divided into different zones to strengthen information security and avoid a waste of network resources. Each zone includes a group of nodes. A node may belong to a plurality of zones. A node in the Ethernet storage system can communicate with only another node that belongs to a same zone as the node. Therefore, information about a node needs to be notified in the Ethernet storage system, so that a node can obtain information about another node that belongs to a same zone as the node.

Figure 3:
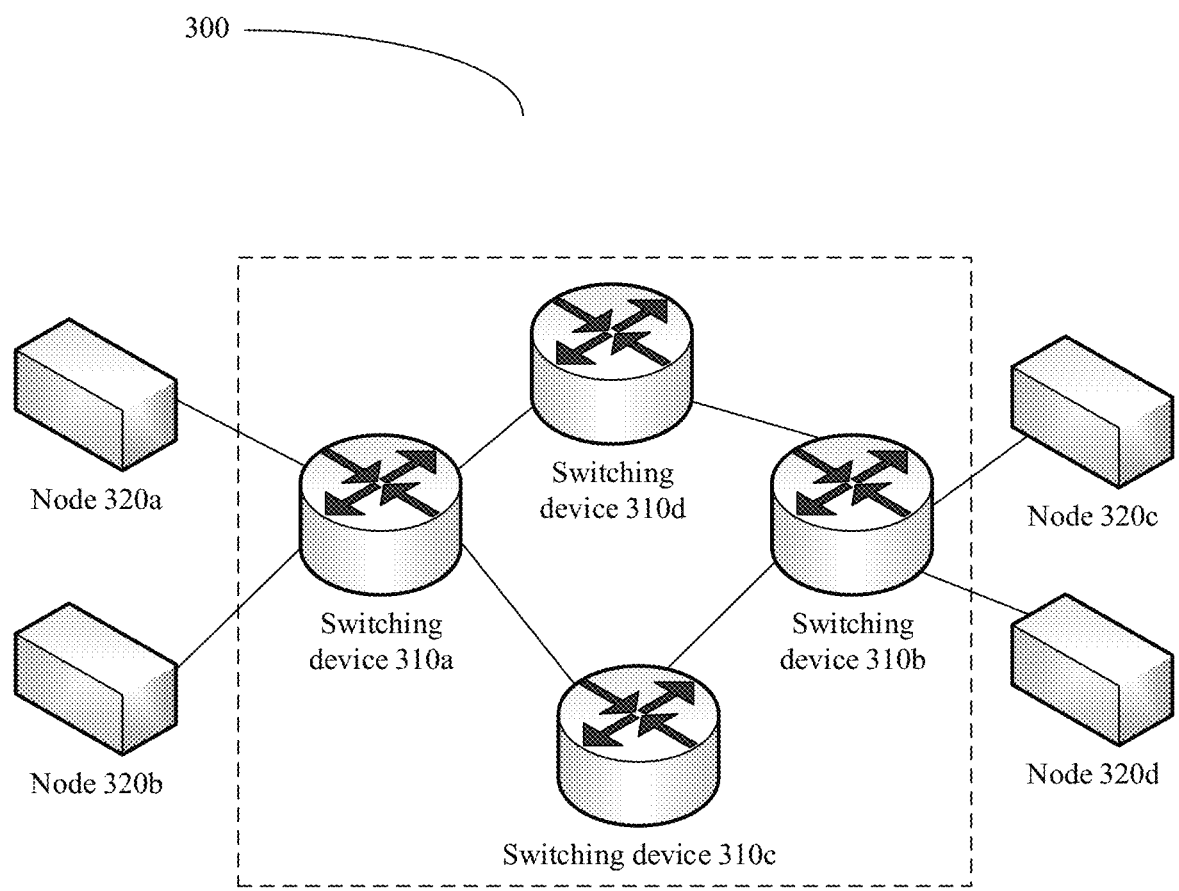
FIG. 3 is a schematic diagram of a structure of still another Ethernet storage system according to an embodiment of this application.
Figure 4A:
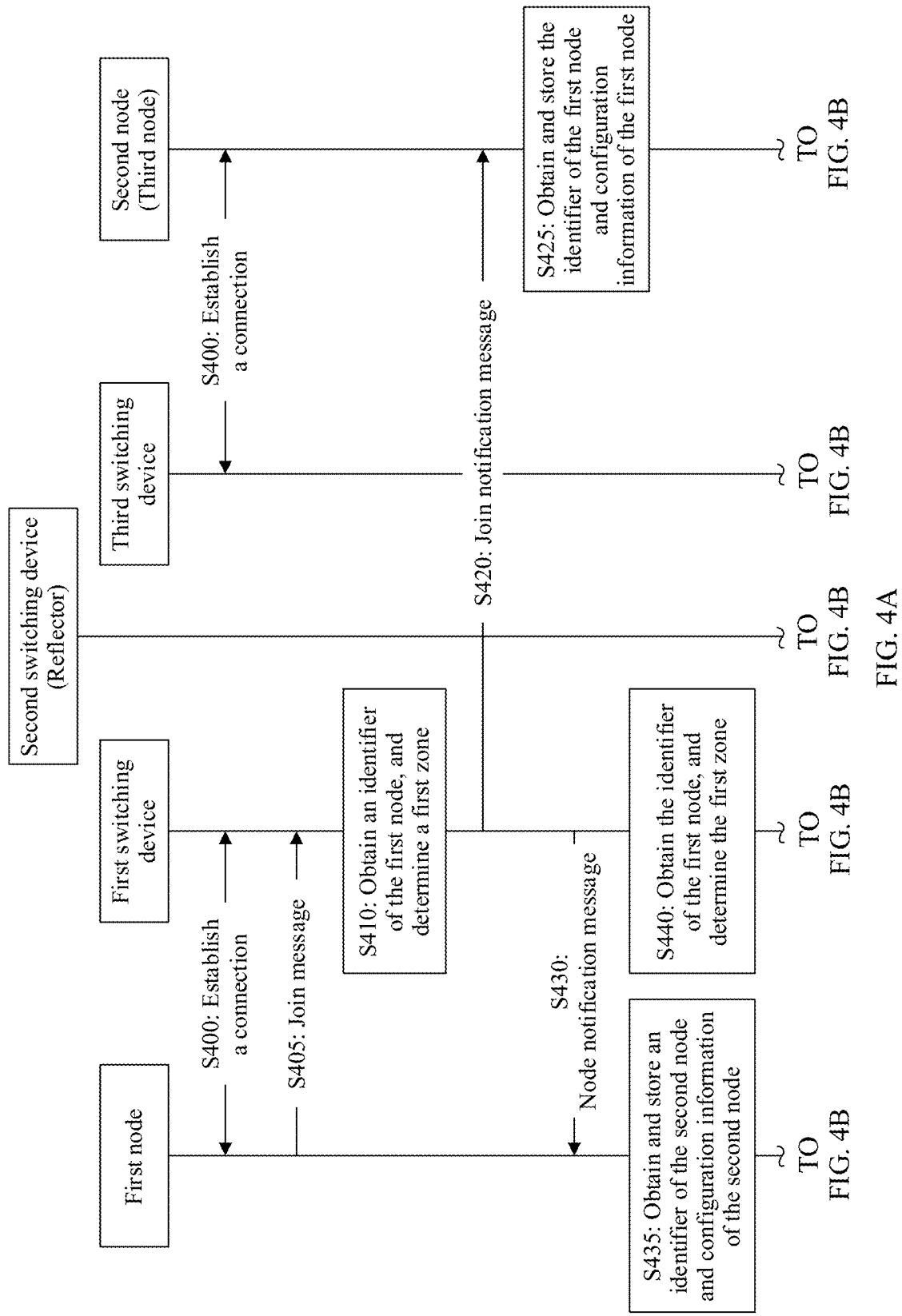
FIG. 4A and FIG. 4B are a schematic flowchart of an information notification method according to an embodiment of this application.
Figure 4B:
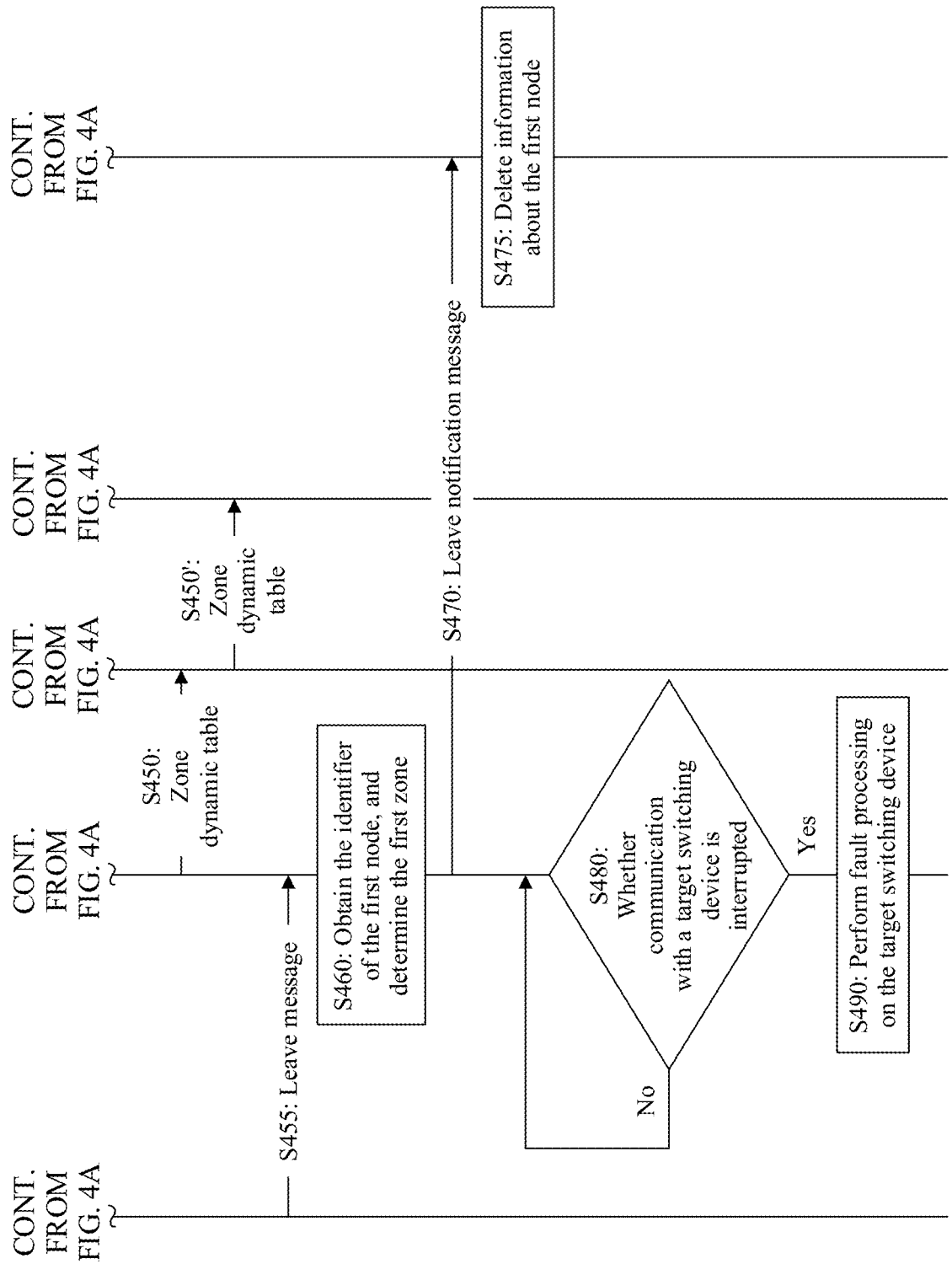

The following describes an information notification method provided in embodiments of this application with reference to FIG. 1 to FIG. 3, and FIG. 4A and FIG. 4B. FIG. 4A and FIG. 4B show an information notification method according to an embodiment of this application. The method includes operations S400 to S495. During specific implementation, operations S400 to S495 may be modified or deleted according to a requirement, and a sequence of any operation in FIG. 4A and FIG. 4B may be adjusted according to a requirement.

In operation S400, a connection between a node and a corresponding switching device is established. When accessing a network, each node needs to establish a connection to a corresponding switching device, to communicate with the switching device. In FIG. 4A and FIG. 4B, an example in which a first node is connected to a first switching device and a second node is connected to a third switching device is used for description. In actual deployment, the first node and the second node may be any node in FIG. 1, FIG. 2, and FIG. 3.

In operation S405, the first node sends a join message to the first switching device.

The first node herein is any node (for example, any one of the nodes 120*a* to 120*d* in FIG. 1, the nodes 220*a* to 220*f* in FIG. 2, and the nodes 320*a* to 320*d* in FIG. 3), and the first switching device is an edge switching device connected to the first node. The join message indicates that the first node wants to join the network, to communicate with another node. The join message includes an identifier of the first node and configuration information of the first node. The identifier of the first node may be any one or more of an internet protocol (IP) address, a media access control (MAC) address, a device name, a device number, and a device connection relationship of the first node. The device connection relationship is used to indicate an identifier of a switching device connected to the first node, and may further indicate a port through which the switching device is connected to the first node. The configuration information of the first node includes a role of the first node, protocol-related information of the first node, and/or the like. In an embodiment, the role of the first node may be a compute node, a storage node, or a general-purpose node (which may serve as both a compute node and a storage node). The protocol-related information of the first node includes a protocol supported by the first node and a port used by the protocol. When the first node is a storage node, the protocol-related information further includes a target identifier length of the protocol, a target identifier of the protocol, and the like. The first node may support one or more protocols, for example, NVMe over ROCE, NVMe over TCP, or iSCSI. The target identifier is used to identify a remote storage target, and may be, for example, an NVMe qualified name (NQN) or an iSCSI qualified name (IQN).

In operation S410, the first switching device receives the join message, obtains the identifier of the first node based on the join message, and determines, based on the identifier of the first node, a first zone corresponding to the first node.

In an embodiment, the first switching device stores a zone table, and the zone table records a zone corresponding to each node. Specifically, the zone table records a correspondence between an identifier of a node and an identifier of a zone. When an Ethernet storage system includes only one switching device, the zone table includes a zone to which all nodes connected to the switching device belong. When the Ethernet storage system includes a plurality of switching devices, the zone table includes a zone to which all nodes connected to all the switching devices belong, and content of zone tables of all the switching devices is the same. The zone table reflects network planning. To be specific, the zone table records all nodes planned to be deployed in the Ethernet storage system. Some of these nodes may be activated and connected to the switching device (these nodes are referred to as active nodes), some nodes may not be actually deployed, and the active nodes may be in an invalid state due to an exception or a fault in subsequent running. The zone table may be configured by a network administrator on a reflector and sent by the reflector to the first switching device, or the zone table may be directly configured on the first switching device. The zone table may have different structures. For example, in FIG. 5A and FIG. 5B, the Ethernet storage system shown in FIG. 3 is used as an example to describe a schematic diagram of a structure of a zone table according to an embodiment of this application. The Ethernet storage system includes the nodes 320*a* to 320*d*. FIG. 5A records a zone corresponding to each node. The node 320*a* corresponds to a zone 1 and a zone 2, the node 320*b* corresponds to the zone 1 and a zone 3, the node 320*c* corresponds to the zone 2, and the node 320*d* corresponds to the zone 1, the zone 2, and the zone 3. That is, each node may correspond to one or more zones. FIG. 5B records a node corresponding to each zone, and each zone includes a plurality of nodes. Because each node may correspond to one or more zones, the first zone in this application actually includes one or more zones corresponding to the first node. For example, when the first node is the node 320*a*, the first zone includes the zone 1 and the zone 2.

In operation S420, the first switching device sends a join notification message to the second node that belongs to the first zone. The join notification message includes the identifier of the first node and the configuration information of the first node.

In an embodiment, the second node is all nodes, other than the first node, of all nodes that belong to the first zone. For example, when the first node 320*a* corresponds to the zone 1 and the zone 2, second nodes determined by the first switching device include the nodes 320*b*, 320*c*, and 320*d*.

Further, the second node is an active node in the first zone. In this case, the first switching device further needs to determine all active nodes other than the first node in the first zone based on a zone dynamic table. The zone dynamic table records information about an active node in each zone. Assuming that the nodes 320*b* and 320*c* in FIG. 3 join the network before the node 320*a* sends the join message, a zone dynamic table on the first switching device is shown as FIG. 6A. Because the node 320*a* corresponds to the zone 1 and the zone 2, second nodes determined by the first switching device based on the zone dynamic table include the node 320*b* and the node 320*c*. The first switching device may send the join notification message to the second node in the following manners:

A. When the first switching device is an access device of the second node, the first switching device directly sends the join notification message to the second node.
B. When the first switching device is not an access device of the second node, and the first switching device is a reflector, the first switching device sends the join notification message to the second node by using the third switching device. The second node accesses the third switching device.
C. When the first switching device is not an access device of the second node, and the first switching device is not a reflector, the first switching device sends the join notification message to a reflector (a second switching device), so that the reflector directly sends the join notification message to the second node, or the reflector sends the join notification message to the second node by using the third switching device (this case is shown in FIG. 4A and FIG. 4B). The second node accesses the third switching device.

In operation S425, the second node receives the join notification message, and obtains and stores the identifier of the first node and the configuration information of the first node.

As described above, the second node may access the first switching device, or may access another switching device. In FIG. 4A and FIG. 4B, an example in which the second node accesses the third switching device (which is not a reflector) is used to describe the first node. After receiving the join notification message by using the third switching device, the second node obtains and stores the identifier of the first node and the configuration information of the first node that are included in the join notification message.

In an embodiment, the second node stores a node configuration table, and the node configuration table is used to record information about a node that the second node can communicate with. For example, each entry of the node configuration table includes an identifier of a node, a role of the node, protocol-related information of the node, and the like. The second node may add the identifier of the first node and the configuration information of the first node to the node configuration table. An entry of the node configuration table may include or may not include a zone to which a node belongs. Because one node may belong to one or more zones, a node recorded in the node configuration table of the second node may also belong to one or more zones.

In operation S430, the first switching device sends a node notification message to the first node. The node notification message includes an identifier of the second node and configuration information of the second node.

After determining the second node, the first switching device further needs to send information about the second node to the first node. The information about the second node includes the identifier of the second node and the configuration information of the second node. When the second node includes a plurality of nodes, the first switching device may simultaneously send information about the plurality of nodes to the first node by using one node notification message, or the first switching device may separately send the information about the plurality of nodes to the first node by using a plurality of node notification messages. The plurality of nodes may belong to a same zone or different zones. The first switching device may send an identifier of a zone of the second node to the first node, or may not send the identifier of the zone of the second node to the first node.

In operation S435, the first node receives the node notification message, and obtains and stores the identifier of the second node and the configuration information of the second node.

Similar to the second node, the first node obtains the identifier of the second node and the configuration information of the second node, and stores the identifier of the second node and the configuration information of the second node in a node configuration table.

In operation S440, the first switching device updates the zone dynamic table based on the join message.

A sequence of operations S430 and S440 is not limited. In operation S440, the first switching device adds information about the first node to the zone dynamic table. For example, when the node 320a in FIG. 3 is the first node, and the node 320a corresponds to the zone 1 and the zone 2, an updated zone dynamic table is shown in FIG. 6B.

Further, the first switching device stores a node dynamic table, and the node dynamic table records information about an active node. The node dynamic table may record an identifier of a node and configuration information of the node, an identifier of a switching device (namely, an access device) connected to the node, and a port (an access device port for short) through which the switching device is connected to the node. Further, the node dynamic table may record a state of a node, and the state may be a valid state or an invalid state. The valid state indicates that the node can communicate normally. The invalid state indicates that an exception or a fault occurs in the node or a link in which the node is located, resulting in deterioration of communication quality of the node or communication failure of the node. Further, the node dynamic table may record a cause of the exception or the fault. After receiving the join message, the first switching device records the information about the first node in the node dynamic table based on the join message. FIG. 7A is a schematic diagram of a node dynamic table according to an embodiment of this application. The node dynamic table corresponds to FIG. 6B, and records information about the node 320b, the node 320c, and the newly added node 320a. In another embodiment, information in the node dynamic table may alternatively be recorded in the zone dynamic table. In other words, the first switching device needs to store only a zone dynamic table, and the zone dynamic table records information shown in FIG. 6 (FIG. 6A or FIG. 6B) and FIG. 7A.

In operation S450, the first switching device sends the zone dynamic table.

That the first switching device sends the zone dynamic table may be that the first switching device sends an updated zone dynamic table, or may be that the first switching device sends only update content of the zone dynamic table. When there is only one switching device (namely, the first switching device) in the Ethernet storage system, the first switching device does not need to perform operation S450. When a plurality of switching devices exist in a switch fabric, if the first switching device is a reflector (for example, the switching device 210c), the first switching device sends the updated zone dynamic table to another switching device (for example, the switching device 210a and the switching device 210b), and the another switching device stores the updated zone dynamic table; or if the first switching device is not a reflector (for example, the switching device 210a), the first switching device sends the updated zone dynamic table to a reflector (for example, the switching device 210c), and then the reflector sends the updated zone dynamic table to another switching device, so that all switching devices in the switch fabric synchronize the zone dynamic table. When a plurality of reflectors (for example, the switching devices 310c and 310d) exist in a switch fabric, the first switching device (for example, the switching device 310a) separately sends the zone dynamic table to the plurality of reflectors, and the plurality of reflectors separately send the zone dynamic table to another switching device (for example, the switching device 310b). In this case, the switching device 310b may separately store the zone dynamic tables sent by the switching devices 310c and 310d. In this way, even if one reflector is faulty, communication is not interrupted. In FIG. 4A and FIG. 4B, an example in which the second access device is a reflector is used for description. In this case, the method may further include operation S450' in which the second access device sends the zone dynamic table to a third access device.

When the node dynamic table is independent of the zone dynamic table, the foregoing process of sending the zone dynamic table is also applicable to sending the node dynamic table. The zone dynamic table and node dynamic table may be sent simultaneously or separately.

In operation S455, the first node sends a leave message to the first switching device. The leave message includes the identifier of the first node.

In operation S460, the first switching device receives the leave message, obtains the identifier of the first node based on the leave message, and determines the first zone based on the identifier of the first node.

In operation S470, the first switching device sends a leave notification message to a third node that belongs to the first zone. The leave notification message includes the identifier of the first node.

For a manner in which the first switching device determines the third node in operation S460, refer to the descriptions in operation S410. The third node in operation S470 may be the same as or different from the second node in operation S420. For example, after the first node sends the join message, if a node leaves or joins the first zone to which the first node belongs, the third node determined in operation S470 is different from the second node determined in operation S420.

In operation S475, the second node receives the leave notification message, and deletes the information about the first node based on the leave notification message.

In an embodiment, the second node receives the leave notification message, obtains the identifier of the first node from the leave notification message, and deletes the information about the first node from the node configuration table based on the identifier of the first node. In deleting the information about the first node, the second node deletes an entry corresponding to the first node from the node configuration table, or the second node sets the entry corresponding to the first node in the node configuration table to invalid. The entry corresponding to the first node includes the identifier of the first node and the configuration information of the first node. After the information about the first node is deleted, the second node no longer communicates with the first node.

In operation S480, the first switching device further determines a target switching device, and detects whether communication with the target switching device is interrupted.

In an embodiment, the first switching device uses all switching devices other than the first switching device in the switch fabric as target switching devices, and detects whether communication with each target switching device is interrupted.

In an embodiment, the first switching device determines the target switching device based on information about an access device of each active node, and detects whether communication with the target switching device is interrupted. In an embodiment, the first switching device obtains an identifier of an active node based on the zone dynamic table, determines information about an access device of each active node based on the identifier of the active node, and then determines the target switching device based on information about access devices of all active nodes. For example, the access devices of all active nodes are added to a set, and then deduplication is performed on the set to obtain a candidate set. Then, another switching device other than the first switching device in the candidate set is used as the target switching device. For example, in FIG. 7A, there are three active nodes 320a, 320b, and 320c in total. The node 320a and the node 320b correspond to the switching device 310a, and the node 320c corresponds to the switching device 310b. In this case, the target switching device determined by the switching device 310a is the switching device 310b.

It should be understood that operation S480 may be performed by any switching device. For example, a target switching device determined by the switching device 310b is the switching device 310a, and target switching devices determined by the switching devices 310c and 310d are the switching devices 310a and 310b.

In another embodiment, the first switching device determines, based on the zone table, a node corresponding to each zone, and determines whether the node accesses the Ethernet storage system. If the node accessed the Ethernet storage system (that is, the node is an active node), a switching device corresponding to the node is added to a set, and deduplication is performed on the set until all nodes in all zones are traversed, to obtain a candidate set. Then, another switching device other than the first switching device in the candidate set is used as the target switching device.

In an embodiment, a detection session is established between the first switching device and each target switching device, to detect whether the communication between the first switching device and the target switching device is interrupted. The detection session may be, for example, a bidirectional forwarding detection (Bidirectional Forwarding Detection, BFD) session or another keepalive session.

Operation S480 may be performed periodically, or may be performed when a specified condition is met. When the communication between the first switching device and the target switching device is not interrupted, operation S480 may continue to be performed. When the communication between the first switching device and the target switching device is interrupted, the first switching device performs operation S490.

In operation S490, the first switching device performs fault processing on the target switching device.

That the first switching device performs fault processing on the target switching device includes the following several cases:

1. The Target Switching Device is not a Reflector.

The first switching device determines a target node corresponding to the target switching device, deletes information about the target node from the zone dynamic table, and sends a deletion notification message. The deletion notification message includes an identifier of the target node. In an embodiment, the node dynamic table may be a subtable of the zone dynamic table, and a node in the zone dynamic table points to information about the node in the node dynamic table. Therefore, deleting the information about the target node from the zone dynamic table includes deleting the information about the node from the node dynamic table. In another embodiment, the first switching device further needs to delete the information about the target node from the node dynamic table.

In an embodiment, the first switching device determines, based on the node dynamic table, a target node (e.g., a local node of the target switching device) corresponding to the target switching device, and then the first switching device deletes information about the target node from the zone dynamic table and the node dynamic table, and publishes a deletion notification message. The deletion notification message includes an identifier of the target node. When there are a plurality of target nodes, identifiers of the plurality of target nodes may be published by using one or more deletion notification messages.

If the first switching device is not a reflector, the first switching device sends the deletion notification message to a reflector, and the reflector sends the deletion notification message to another switching device other than the target switching device and the first switching device. If the first switching device is a reflector, the first switching device sends the deletion notification message to another switching device other than the target switching device. If the first switching device is connected to a local node that belongs to a same zone as the target node, the first switching device further sends the deletion notification message to the local node. Each switching device that receives the deletion notification message also sends the deletion notification message to a local node that is connected to the switching device and that belongs to a same zone as the target node.

Each switching device that receives the deletion notification message deletes the information about the target node from the zone dynamic table and the node dynamic table. Each node that receives the deletion notification message deletes the information about the target node from the node configuration table, to avoid communicating with the target node.

2. The Target Switching Device is a Reflector.

When the target switching device is a reflector, the first switching device is not a reflector, and the first switching device deletes data received from the target switching device. The data may include one or more pieces of the following content: a zone table, a zone dynamic table, a node dynamic table, and other information sent by the target switching device to the first switching device.

In an embodiment of this application, if a switching device is not a reflector, the switching device records data received from a reflector, and establishes an association between the data and the reflector. In this way, when communication between the switching device and the reflector is interrupted, the switching device deletes the data received from the reflector.

Further, the first switching device may further detect whether the first node is locally unreachable. When the first node is locally unreachable, the first switching device determines the first zone to which the first node belongs, and then sends a fault notification message to a fourth node that belongs to the first zone. The fourth node may be the same as a node included in the second node, or may be different from the node included in the second node. For example, after the first node sends the join message and joins the Ethernet storage system, when another node in the first zone to which the first node belongs leaves the Ethernet storage system, nodes included in the first zone change. When the first node is locally unreachable, the fourth node included in the first zone is different from the second node included in the first zone when the first node joins the Ethernet storage system. The fault notification message includes the identifier of the first node. In this application, a node is "locally unreachable" when data or a message cannot be forwarded to the node by a switching device of the node. When communication between the first switching device and the first node is interrupted, or when a route to the first node that is stored in the first switching device is invalid, the first switching device determines that the first node is locally unreachable. For example, when another node cannot send a message to the first node by using the first switching device because a fault occurs in a link between the first node and the first switching device, the first node is locally unreachable relative to the first switching device. The interruption of communication between the first switching device and the first node may be, for example, that a port through which the first switching device is connected to the first node is invalid, or the first switching device does not receive a keepalive message from the first node within a specified time period (for example, every 5 minutes, every N specified keepalive message periods, or a specified time point). The port through which the first switching device is connected to the first node is invalid, that is, the port that is of the first switching device and that is used to connect to the first node is in a faulty (for example, down) state. The port through which the first switching device is connected to the first node may be invalid in a plurality of cases. For example, a port of the first switching device for connecting to the first node is faulty, a port of the first node for connecting to the first switching device is faulty, a cable between the first switching device and the first node is faulty, the first node is powered off, the first node is reset, an optical module of the first switching device is faulty, a priority flow control (PFC) storm exists in the port, or a quantity of error packets received by the port exceeds a specified threshold when the packet is checked, where the foregoing error may be, for example, a cyclic redundancy code check (CRC) error.

Further, the first switching device may further modify a state of the first node in the node dynamic table as an invalid state and record a fault cause. For example, the node 320a is connected to a port 2 of the switching device 310a. When the port 2 is considered faulty due to a CRC check error, the first switching device may modify the node dynamic table shown in FIG. 7A to a node dynamic table shown in FIG. 7B. Optionally, the first switching device may delete the information about the first node from the zone dynamic table.

In an embodiment, the first switching device may send the fault notification message to another switching device in the switch fabric, and the switching device that receives the fault notification message determines a local node that belongs to a same zone as the first node, and sends the fault notification message to the local node. There may be one or more local nodes.

In another embodiment, the first switching device determines the first zone to which the first node belongs, and determines the second node that belongs to the first zone. Then, the first switching device directly sends the fault notification message to the second node.

The node that receives the fault notification message deletes the information about the first node from the node configuration table based on the identifier of the first node, to avoid service interruption caused by communication with the first node.

The node join message and the node notification message in embodiments of this application are message names provided for different objects for ease of description. In an actual application, the node access message and the node notification message may be messages in a same format or messages in different formats, and may be messages of a same type or messages of different types.

The leave notification message, the deletion notification message, and the fault notification message in embodiments of this application are message names provided for different scenarios for ease of description. In an actual application, the leave notification message, the deletion notification message, and the fault notification message may be messages in a same format or messages in different formats, and may be messages of a same type or messages of different types. In addition, because each of the leave notification message, the deletion notification message, and the fault notification message may enable a node that receives the messages to delete information about the corresponding node, the leave notification message, the deletion notification message, and the fault notification message may be collectively referred to as a deletion message.

FIG. 4A and FIG. 4B are used to describe a processing procedure of an information notification method according to an embodiment of this application. In actual deployment, each switching device may implement all or some functions performed by the foregoing different switching devices, and each node may implement all or some functions performed by the foregoing first node and second node.

In embodiments of this application, after establishing a connection to an edge switching device, a node in an Ethernet storage system actively sends a join message to the switching device, to report configuration information of the node. The switching device may determine, based on an identifier of the node, a zone to which the node belongs, and send the configuration information of the node to another node that belongs to a same zone as the node. In this way, each node can obtain information about a node that the node can communicate with, so that service processing efficiency of the Ethernet storage system is improved.

In the foregoing embodiment provided in this application, the information notification method provided in embodiments of this application is described separately from perspectives of the node and the switching device. It may be understood that, to implement the foregoing functions, the node and the switching device in embodiments of this application include corresponding hardware structures and/or software modules for performing the functions. A person skilled in the art should be easily aware that functions and operations in the examples described in embodiments disclosed in this application can be implemented in a form of hardware, a combination of hardware and computer software, or the like. Whether a function is performed by hardware or hardware driven by computer software depends on particular applications and design constraints of the technical solutions. A person skilled in the art uses different methods to implement the described functions, but it should not be considered that the implementation goes beyond the scope of this application. The following describes a structure of a node in this application from different perspectives. To implement the method shown in FIG. 4A and FIG. 4B of this application, an embodiment of this application provides a switching device 800. The switching device 800 may be the first switching device in FIG. 4A and FIG. 4B. In addition to components shown in FIG. 8, the switching device 800 may further include another component to implement more functions.

Figure 8:
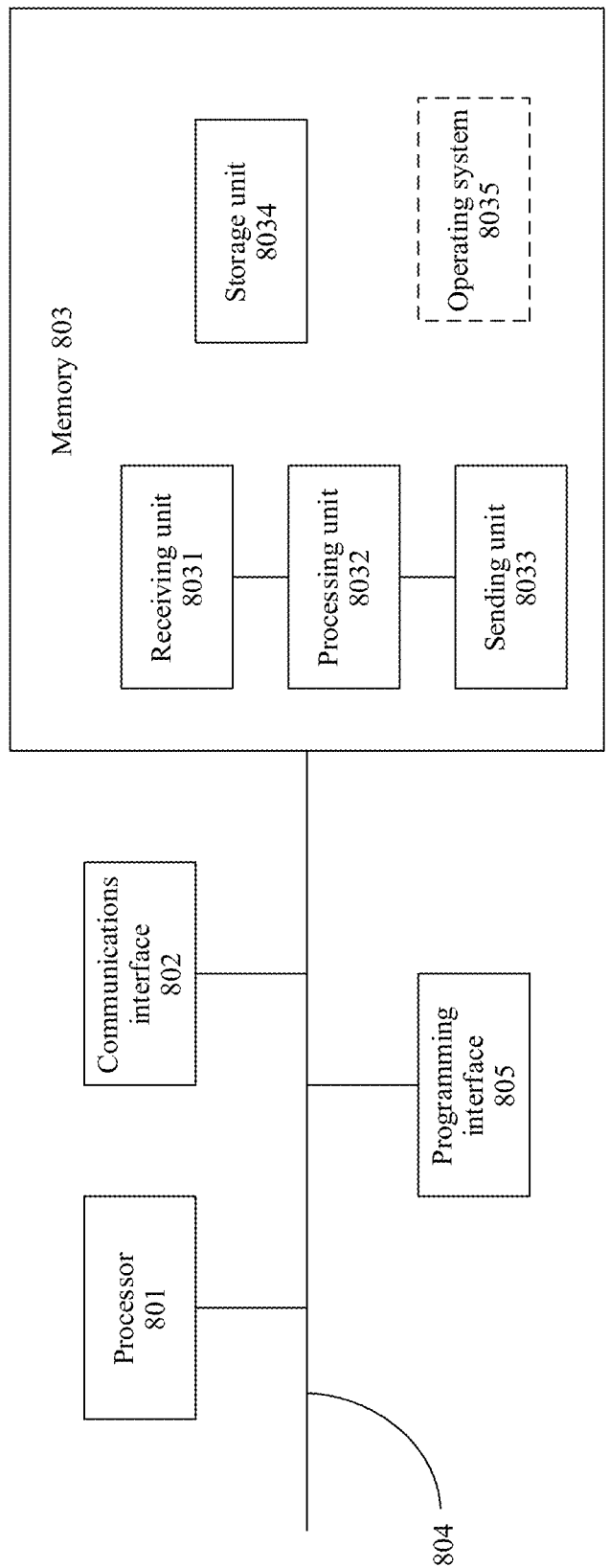
FIG. 8 is a schematic diagram of a structure of a switching device according to an embodiment of this application.

As shown in FIG. 8, the switching device 800 includes a receiving unit 8031, a processing unit 8032, and a sending unit 8033. In this embodiment of this application, the receiving unit 8031 is configured to perform one or more of operations S405 and S455, the processing unit 8032 is configured to perform one or more of operations S410, S440, S460, S480, and S490, and the sending unit 8033 is configured to perform one or more of operations S420, S430, S450, S450', and S470. The following describes in detail functions of the receiving unit 8031, the processing unit 8032, and the sending unit 8033.

In an embodiment, the receiving unit 8031 is configured to receive a join message sent by a first node. The join message includes an identifier of the first node and configuration information of the first node. The first switching device is an access device of the first node. The processing unit 8032 is configured to: obtain the identifier of the first node based on the join message, and determine, based on the identifier of the first node, a first zone corresponding to the first node. The sending unit 8033 is configured to send a join notification message to a second node that belongs to the first zone. The join notification message includes the identifier of the first node and the configuration information of the first node.

In an embodiment, the sending unit 8033 is further configured to send a node notification message to the first node. The node notification message includes an identifier of the second node and configuration information of the second node.

In an embodiment, the switching device further includes a storage unit 8034, and the storage unit is configured to store a zone table. The zone table records a correspondence between a zone and an identifier of a node. When the processing unit 8032 determines, based on the identifier of the first node, the first zone corresponding to the first node, the processing unit 8032 is configured to determine, based on the zone table and the identifier of the first node, the first zone corresponding to the first node.

In an embodiment, the storage unit 8034 is further configured to store a zone dynamic table. The zone dynamic table records information about an active node corresponding to each zone. The processing unit 8032 is further configured to: determine, based on the zone dynamic table, that the second node is an active node in the first zone, and record information about the first node in the zone dynamic table.

In an embodiment, the information about the active node includes information about an access device of the active node, and the processing unit 8032 is further configured to: determine a target switching device based on information about an access device of each active node in the zone dynamic table, and detect whether communication between the first switching device and the target switching device is interrupted.

In an embodiment, when the communication between the first switching device and the target switching device is interrupted, the processing unit 8032 is further configured to determine a target node corresponding to the target switching device, delete information about the target node from the zone dynamic table, and send a deletion notification message. The deletion notification message includes an identifier of the target node.

In an embodiment, an Ethernet storage system further includes a second switching device. The second switching device is a reflector. The receiving unit 8031 is further configured to receive the zone table sent by the second switching device. The sending unit 8033 is further configured to send the zone dynamic table to the second switching device.

In an embodiment, when the sending unit 8033 sends the join notification message to the second node that belongs to the first zone, the processing unit 8032 is configured to send the join notification message to the second switching device.

In an embodiment, the receiving unit 8031 is further configured to receive a leave message sent by the first node. The leave message includes the identifier of the first node. The processing unit 8032 is further configured to determine the first zone based on the identifier of the first node. The sending unit 8033 is further configured to send a leave notification message to a third node that belongs to the first zone. The leave notification message includes the identifier of the first node.

In an embodiment, the processing unit 8032 is further configured to: detect whether the first node is locally reachable, and when the first node is locally unreachable, determine the first zone. The sending unit 8033 is further configured to send a fault notification message to a fourth node that belongs to the first zone. The fault notification message includes the identifier of the first node.

The receiving unit 8031, the processing unit 8032, and the sending unit 8033 may be implemented by hardware, or may be implemented by software. When the receiving unit 8031, the processing unit 8032, and the sending unit 8033 are implemented by software, as shown in FIG. 8, the switching device 800 may further include a processor 801, a communications interface 802, and a memory 803. The processor 801, the communications interface 802, and the memory 803 are connected by using a bus system 804. The memory 803 is configured to store program code. The program code includes instructions that can implement functions of the receiving unit 8031, the processing unit 8032, and the sending unit 8033. The processor 801 may invoke program code in the memory 803, to implement functions of the receiving unit 8031, the processing unit 8032, and the sending unit 8033. Further, the switching device 800 may further include a programming interface 808, configured to write the program code into the memory 803.

In an embodiment of this application, the processor 801 may be a central processing unit (CPU), or the processor 801 may be another general-purpose processor, a digital signal processor (DSP), or an application-specific integrated circuit (ASIC), a field programmable gate array (FPGA) or another programmable logic device, a discrete gate or transistor logic device, a discrete hardware component, or the like. The general-purpose processor may be a microprocessor or any conventional processor. The processor 801 may include one or more processing cores.

The communications interface 802 is configured to communicate with an external device, for example, implement a receiving and/or sending function in cooperation with the program code in the memory 803. The communications interface 802 in FIG. 8 is merely an example. In actual application, the switching device 800 may include a plurality of communications interfaces, to connect to a plurality of different peripheral devices and communicate with these peripheral devices.

The memory 803 may include a read-only memory (ROM) or a random access memory (RAM). Any other proper type of storage device may also be used as the memory 803. The memory 803 may include one or more storage devices. The memory 803 may further store an operating system 8034, and the operating system is configured to support running of the switching device 800.

In addition to a data bus, the bus system 804 may further include a power bus, a control bus, a status signal bus, and the like. However, for clear description, various types of buses in the figure are marked as the bus system 804.

To implement the method shown in FIG. 4A and FIG. 4B of this application, an embodiment of this application further provides a terminal device 900. The terminal device 900 may be a node (in this case, the node is a physical device), or may be a host on which the node is located (in this case, the node is a virtual device running on a physical device). The terminal device 900 may have functions of the first node and/or the second node in FIG. 4A and FIG. 4B. In addition to components shown in FIG. 9, the terminal device 900 may further include another component to implement more functions.

Figure 9:
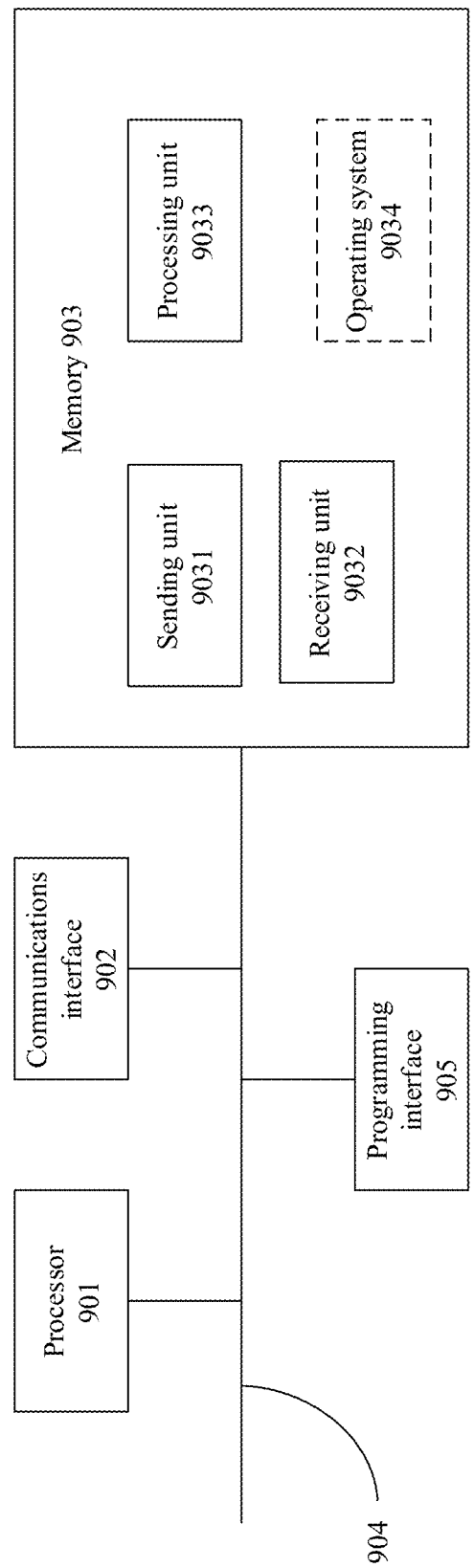
FIG. 9 is a schematic diagram of a structure of a terminal device according to an embodiment of this application.

As shown in FIG. 9, the terminal device 900 includes a sending unit 9031, a receiving unit 9032, and a processing unit 9033. In this embodiment of this application, the sending unit 9031 is configured to perform operation S405 or S455, and the receiving unit 9032 is configured to perform the receiving behavior in operation S420, S430, or S470. The processing unit 9033 is configured to perform one or more of operations S425, S435, and S475. The following describes in detail functions of the sending unit 9031, the receiving unit 9032, and the processing unit.

The sending unit 9031 is configured to send a join message to a first switching device in an Ethernet storage system. The join message includes an identifier of the first node and configuration information of the first node. The first switching device is an access device of the first node.

The receiving unit 9032 is configured to receive a node notification message sent by the first switching device. The node notification message includes an identifier of a second node and configuration information of the second node. The second node and the first node belong to a same zone.

In an embodiment, the processing unit 9033 is configured to obtain and store information about the second node. The information about the second node includes the identifier of the second node and the configuration information of the second node.

In an embodiment, the receiving unit 9032 is further configured to receive a deletion message sent by the first switching device. The deletion message includes the identifier of the second node.

The processing unit 9033 is further configured to delete the information about the second node based on the deletion message.

The sending unit 9031, the receiving unit 9032, and the processing unit 9033 may be implemented by hardware, or may be implemented by software. When the sending unit 9031, the receiving unit 9032, and the processing unit 9033 are implemented by software, as shown in FIG. 9, the terminal device 900 may further include a processor 901, a communications interface 902, and a memory 903. The processor 901, the communications interface 902, and the memory 903 are connected by using a bus system 904. The memory 903 is configured to store program code. The program code includes instructions that can implement functions of the sending unit 9031, the receiving unit 9032, and the processing unit 9033. The processor 901 may invoke program code in the memory 903, to implement functions of the sending unit 9031, the receiving unit 9032, and the processing unit 9033. Further, the terminal device 900 may further include a programming interface 905, configured to write the program code into the memory 903.

In this embodiment of this application, the processor 901 may be a CPU, or the processor 901 may be another general-purpose processor, a DSP, an ASIC, an FPGA or another programmable logic device, a discrete gate or a transistor logic device, a discrete hardware component, or the like. The general-purpose processor may be a microprocessor or any conventional processor. The processor 901 may include one or more processing cores.

The communications interface 902 is configured to communicate with an external device, for example, implement a receiving and/or sending function in cooperation with the program code in the memory 903. The communications interface 902 in FIG. 9 is merely an example. In actual application, the terminal device 900 may include a plurality of communications interfaces, to connect to a plurality of different peripheral devices and communicate with these peripheral devices.

The memory 903 may include a ROM or a RAM. Any other proper type of storage device may also be used as the memory 903. The memory 903 may include one or more storage devices. The memory 903 may further store an operating system 9034, and the operating system 9034 is configured to support running of the terminal device 900. The second information may be stored in the memory 903, or may be stored in another memory other than the memory 903.

In addition to a data bus, the bus system 904 may further include a power bus, a control bus, a status signal bus, and the like. However, for clear description, various types of buses in the figure are marked as the bus system 904.

Components of the switching device 800 or the terminal device 900 provided in embodiments of this application are merely examples. A person skilled in the art may add or remove a component according to a requirement, or may split functions of one component into a plurality of components for implementation. For implementations of functions of the switching device 800 or the terminal device 900 in this application, refer to descriptions of operations in FIG. 3.

Based on the foregoing descriptions of implementations, a person skilled in the art may clearly understand that the switching device 800 or the terminal device 900 in this application may be implemented by hardware, or may be implemented by software in addition to a necessary universal hardware platform. Based on such an understanding, the technical solutions of this application may be embodied in a form of a hardware product or a software product. The hardware product may be a dedicated chip or a processor. The software product may be stored in a nonvolatile storage medium (which may be a CD-ROM, a USB flash drive, a removable hard disk, or the like), and the software product includes several instructions. When the software product is executed, a computer device may be enabled to perform the methods described in embodiments of this application.

The foregoing descriptions are merely preferred implementations of this application. It should be noted that a person of ordinary skill in the art may make several improvements or polishing without departing from the principle of this application and the improvements or polishing shall fall within the protection scope of this application.

What is claimed is:

1. An information notification method, comprising:
receiving, by a first switching device in an Ethernet storage system, a join message sent by a first node, wherein the join message comprises an identifier of the first node and a first configuration information of the first node, the first switching device is an access device of the first node, and the first node is connected to the first switching device by using Ethernet; and
sending, by the first switching device, a join notification message to a second node that belongs to a same first zone as the first node, wherein the join notification message comprises the identifier of the first node and a second configuration information of the first node, the second node is connected to the first switching device by using Ethernet.

2. The method according to claim 1, further comprising:
sending, by the first switching device, a node notification message to the first node, wherein the node notification message comprises an identifier of the second node and a third configuration information of the second node.

3. The method according to claim 1, wherein determining the first zone corresponding to the first node comprises:
determining the first zone corresponding to the first node based on a zone table and the identifier of the first node, wherein the zone table records a correspondence between a zone and an identifier of a node.

4. The method according to claim 3, further comprising:
recording information about the first node in a zone dynamic table, wherein the zone dynamic table records information about an active node corresponding to each zone; and
determining, based on the zone dynamic table, that the second node is an active node in the first zone.

5. The method according to claim 4, further comprising:
determining a target switching device based on information about an access device of each active node in the zone dynamic table; and
detecting whether communication between the first switching device and the target switching device is interrupted.

6. The method according to claim 5, wherein when the communication between the first switching device and the target switching device is interrupted, the method further comprises:
determining a target node corresponding to the target switching device;
deleting information about the target node from the zone dynamic table; and
sending a deletion notification message, wherein the deletion notification message comprises an identifier of the target node.

7. The method according to claim 4, further comprising:
receiving a zone table sent by a second switching device of the Ethernet storage system, wherein the second switching device is a reflector; and
sending the zone dynamic table to the second switching device.

8. The method according to claim 7, wherein the sending a join notification message to a second node that belongs to the first zone comprises:
sending the join notification message to the second switching device.

9. The method according to claim 1, further comprising:
receiving a leave message sent by the first node, wherein the leave message comprises the identifier of the first node;
determining the first zone based on the identifier of the first node; and
sending a leave notification message to a third node that belongs to the first zone, wherein the leave notification message comprises the identifier of the first node.

10. The method according to claim 9, further comprising:
detecting whether the first node is locally reachable; and
when the first node is locally unreachable, determining the first zone and sending a fault notification message to a fourth node that belongs to the first zone, wherein the fault notification message comprises the identifier of the first node.

11. An information notification method, comprising:
sending, by a first node in an Ethernet storage system, a join message to a first switching device in the Ethernet storage system, wherein the join message comprises an identifier of the first node and a first configuration information of the first node, the first switching device is an access device of the first node, and the first node is connected to the first switching device by using Ethernet; and
receiving, by the first node, a node notification message sent by the first switching device, wherein the node notification message comprises an identifier of a second node and a third configuration information of the second node, and the second node and the first node belong to a same zone, the second node is connected to the first switching device by using Ethernet.

12. The method according to claim 11, further comprising:
obtaining and storing, by the first node, information about the second node, wherein the information about the second node comprises the identifier of the second node and the third configuration information of the second node.

13. The method according to claim 12, further comprising:
receiving a deletion message sent by the first switching device, wherein the deletion message comprises the identifier of the second node; and
deleting the information about the second node based on the deletion message.

14. A switching device, operating as a first switching device in an Ethernet storage system, comprising:
a memory comprising instructions;
a processor coupled to the memory, wherein when the instructions are executed by the processor, cause the switching device to:
receive a join message sent by a first node, wherein the join message comprises an identifier of the first node and a first configuration information of the first node, the first switching device is an access device of the first node, and the first node is connected to the first switching device by using Ethernet;
and
send a join notification message to a second node that belongs to a same first zone as the first node, wherein the join notification message comprises the identifier of the first node and a second configuration information of the first node, the second node is connected to the first switching device by using Ethernet.

15. The switching device according to claim 14, wherein the switching device is further configured to:
send a node notification message to the first node, wherein the node notification message comprises an identifier of the second node and a third configuration information of the second node.

16. The switching device according to claim 14, wherein the switching device is further configured to store a zone table that records a correspondence between a zone and an identifier of a node; and
when the switching device determines the first zone corresponding to the first node based on the identifier of the first node, the switching device is configured to
determine, based on the zone table and the identifier of the first node, the first zone corresponding to the first node.

17. The switching device according to claim 16, wherein the switching device is further configured to store a zone dynamic table that records information about an active node corresponding to each zone; and
determine, based on the zone dynamic table, that the second node is an active node in the first zone; and
record information about the first node in the zone dynamic table.

18. The switching device according to claim 17, wherein the information about the active node comprises information about an access device of the active node, and the switching device is further configured to:
determine a target switching device based on information about an access device of each active node in the zone dynamic table; and
detect whether communication between the first switching device and the target switching device is interrupted.

19. The switching device according to claim 18, wherein when the communication between the first switching device and the target switching device is interrupted, the switching device is further configured to:
determine a target node corresponding to the target switching device;
delete information about the target node from the zone dynamic table; and
send a deletion notification message, wherein the deletion notification message comprises an identifier of the target node.

20. The switching device according to claim 19, wherein the switching device is further configured to:
receive a zone table sent by a second switching device of the Ethernet storage system, wherein the second switching device is a reflector; and
send the zone dynamic table to the second switching device.

21. The switching device according to claim 20, wherein when the switching device sends the join notification message to the second node that belongs to the first zone, the switching device is further configured to send the join notification message to the second switching device.

22. The switching device according to claim 14, wherein the switching device is further configured to
receive a leave message sent by the first node, wherein the leave message comprises the identifier of the first node;
determine the first zone based on the identifier of the first node; and
send a leave notification message to a third node that belongs to the first zone, wherein the leave notification message comprises the identifier of the first node.

23. The switching device according to claim 22, wherein the switching device is further configured to:
detect whether the first node is locally reachable, and determine the first zone when the first node is locally unreachable; and
send a fault notification message to a fourth node that belongs to the first zone, wherein the fault notification message comprises the identifier of the first node.

24. A node, operating as a first node of an Ethernet storage system, comprising:
a memory comprising instructions;
a processor coupled to the memory, wherein when the instructions are executed by the processor, cause the node to:

send a join message to a first switching device in the Ethernet storage system, wherein the join message comprises an identifier of the first node and a first configuration information of the first node, the first switching device is an access device of the first node, and the first node is connected to the first switching device by using Ethernet; and receive a node notification message sent by the first switching device, wherein the node notification message comprises an identifier of a second node and a third configuration information of the second node, and the second node and the first node belong to a same zone, the second node is connected to the first switching device by using Ethernet.

25. The node according to claim 24, wherein the instructions further cause the node to:

obtain and store information about the second node, wherein the information about the second node comprises the identifier of the second node and the third configuration information of the second node.

26. The node according to claim 25, wherein the instructions further cause the node to:

receive a deletion message sent by the first switching device, wherein the deletion message comprises the identifier of the second node; and delete the information about the second node based on the deletion message.

* * * * *